United States Patent [19]

Akinfiev

[11] Patent Number: 4,958,113

[45] Date of Patent: Sep. 18, 1990

[54] METHOD OF CONTROLLING MECHANICAL RESONANCE HAND

[76] Inventor: Teodor S. Akinfiev, ulitsa Marshala Timoshenko, 44, kv.48., Moscow, U.S.S.R.

[21] Appl. No.: 328,169

[22] Filed: Mar. 24, 1989

[51] Int. Cl.$^5$ .............................................. G05B 19/42
[52] U.S. Cl. .............................. 318/568.18; 318/571; 318/573; 318/574; 364/513; 901/20
[58] Field of Search .............................. 318/560–573, 318/630–638; 364/513; 901/20–24

[56] References Cited

U.S. PATENT DOCUMENTS

| | | | |
|---|---|---|---|
| Re. 30,132 | 10/1979 | Irie .............................. | 318/568.15 |
| 4,348,731 | 9/1982 | Kogawa ...................... | 364/174 X |
| 4,404,505 | 9/1983 | Swanson et al. ............ | 318/603 X |
| 4,453,221 | 6/1984 | Davis et al. ................. | 318/573 X |
| 4,506,335 | 3/1985 | Magauson .................... | 318/574 X |
| 4,518,909 | 5/1985 | Friedli et al. ............... | 318/434 X |
| 4,541,060 | 9/1985 | Kogawa ...................... | 364/513 |
| 4,598,380 | 7/1986 | Holmes et al. .............. | 318/568.15 |
| 4,625,285 | 11/1986 | Mori et al. .................. | 318/568.17 X |
| 4,683,543 | 7/1987 | Hiragawa et al. ........... | 318/573 X |
| 4,705,999 | 11/1987 | Soji et al. .................... | 318/568.18 |
| 4,774,445 | 9/1988 | Penkar ......................... | 364/513 X |
| 4,815,007 | 3/1989 | Sakai et al. .................. | 318/571 X |
| 4,819,184 | 4/1989 | Jonsson et al. .............. | 364/513 |
| 4,829,219 | 5/1989 | Penkar ......................... | 318/574 X |

FOREIGN PATENT DOCUMENTS 1346419 10/1987 U.S.S.R. .

OTHER PUBLICATIONS

USSR Academy of Sciences, Mashinovedeniye: No. 6, 1983 (Moscow), Resonance Manipulation Systems with Electrid Drives, pp. 18–20, T. S. Akinfiev.
S. D. Burdakov et al., "Proyektirovaniye Manipulatorov Promyshlennykh Robotov I Robotizirovannykh Kompleksov", Vysshaya Skhole (Moscow), 1986, pp. 146–147.
Nauda I Zhizn., No. 9, 1985 (Moscow), A. Umanski, The Taming of Resonance, pp. 22–23.

Primary Examiner—William M. Shoop, Jr.
Assistant Examiner—Paul Ip
Attorney, Agent, or Firm—Lilling and Lilling

[57] ABSTRACT

The method of controlling a mechanical hand includes releasing the head in its initial position, moving the hand to its target position and retaining the hand in its target position. With the hand moving towards its target position, the path of its travel is divided into a portion registering the parameters of its motion and a portion correcting the law of its motion. With the hand moving over the registering portion, a reference voltage is supplied to the drive motor, and the speed and running coordinate of the moving hand are measured and registered. With the hand moving over the correcting portion, its speed is measured, and the difference between the speeds measured at the two portions is computed to shape an additional voltage. A voltage is then fed to the drive motor, which is an algebraic sum of the reference voltage and additional voltage.

20 Claims, 1 Drawing Sheet

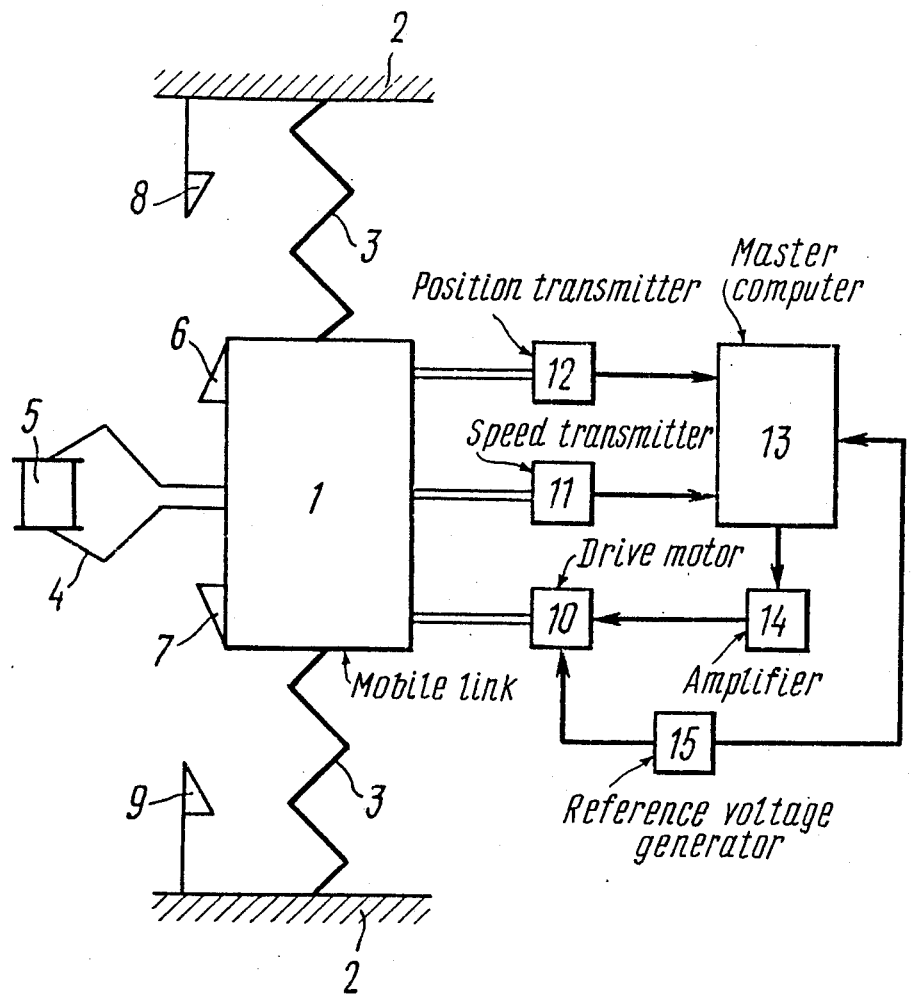

METHOD OF CONTROLLING MECHANICAL RESONANCE HAND

BACKGROUND OF THE INVENTION

The invention relates to methods of controlling manipulators, and more particularly it relates to a method of controlling a mechanical resonance hand.

FIELD OF THE INVENTION

The present invention is applicable in controlling robotic systems intended for handling and transport operations in serving presses, metalworking machine-tools, for loading and unloading process equipment and articles, for painting and welding.

DESCRIPTION OF THE PRIOR ART

There is known a method of controlling a mechanical resonance hand, including the steps of releasing the hand in its initial position, moving the hand towards its required or target position by feeding to the drive motor a voltage of the predetermined polarity, and fixing or retaining the hand in the required position (USSR Academy of Sciences, "Mashinovedeniye", No. 6, 1983 (Moscow), T. S. Akinfiev, Resonansnye manipulatsionnye sistemy s elektroprivodom/Resonance manipulation systems with electric drives/, pp. 18–20). This control method, however, would not support sufficient reliability of the hand's performance, as only with the hand moving with a manipulated object of the preset mass its inertia and momentum would be fully compensated for by the resilient member as the hand is halted and retained in the required position. Although the power input with this method of controlling the mechanical resonance hand is minimal, even slight alterations of the mass of the manipulated object or of friction forces, same as external influences, could result in the mechanical hand halting short of reaching the required position, which amounts to a fault in its operation. Feeding of additional voltage to the drive motor results in impact loads at the moment of retaining the hand in the required position, also impairing its performance reliability.

There is further known a method of controlling a mechanical resonance hand (Nauka i Zhizn, No. 9, 1985 (Moscow), A. Umanski, "Priruchenie resonansa" /The Taming of Resonance/, pp. 22–29), including the steps of releasing the hand in its initial position, moving the hand towards the required position while feeding a supply voltage to the drive motor with the hand moving over at least a part of its path, and fixing or retaining the hand in the required or target position. However, this method would not support sufficient performance reliability of the mechanical hand, as the potential energy of the manipulated object tends to vary during the operation of the hand. When the gravity centre of the mechanical hand is at different vertical levels in the initial position of the mechanical hand and in its target position, the voltage value fed to the drive motor in operation of the mechanical hand with manipulated object or different weights would be either excessive or insufficient. With the voltage being excessive, this would lead to superfluous power input and impaired durability of the mechanical hand on account of strong impacts of the movable part of the retaining device against its stationary part at the moments of retaining the mechanical arm in the required position, adversely affecting the performance reliability of the mechanical hand over its service period. With the voltage being insufficient, the mechanical hand tends to halt prematurely, short of reaching the target position, and to retract towards its initial position, which amounts to a fault in its performance. Other external influences also tend to affect the performance reliability of the mechanical hand controlled in the abovedescribed manner.

SUMMARY OF THE INVENTION

It is an object of the present invention to provide a method of controlling a mechanical resonance hand, which enhances the performance reliability of the mechanical hand.

This object is attained in a method of controlling a mechanical resonance hand, including the steps of of releasing the hand in its initial position, moving the hand towards the required position while feeding the supply voltage with the hand moving over at least a part of its path, and retaining the hand in the required position, which method. In accordance with the present invention, the method further includes, with the hand moving towards its required position, dividing the path of the travel of the hand into a portion of registering the parameters of the hand motion and a portion of correcting the law of the hand motion. With the hand moving over the portion of registering the parameters of the hand motion, the method involves feeding a reference voltage, measuring and registering the speed and running coordinate of the hand; with the hand moving over the portion of correcting the law of the hand motion, measuring at a corresponding point of the path the speed of the hand, computing the difference between the registered speed over the portion of registering the parameters of the hand motion and the measured speed at the corresponding point of the portion of correcting the law of the hand motion, shaping an additional voltage whose value is a function of the value of the computed difference and whose sign is opposite to the sign of this difference, and with the hand moving over at least a part of the portion of correcting the law of the hand motion, feeding a voltage which is the algebraic sum of the reference voltage and additional voltage.

It is expedient in the method of controlling a mechanical resonance hand to measure and register the speed and running coordinate of the hand at one point of the portion of registering the parameters of the hand motion.

It is alternatively expedient in the method of controlling a mechanical resonance head to measure and register the speed and running coordinate of the hand at at least two points of the portion of registering the parameters of the hand motion.

It may be preferable in the method of controlling a mechanical resonance hand to measure and register the speed and running coordinate of the hand continuously at every point of the portion of registering the parameters of the hand motion.

It is expedient in the method of controlling a mechanical resonance hand to divide the path of the hand motion into two equal portions.

It is desirable in the method of controlling a mechanical resonance hand to select the respective corresponding points of the path at the portion of registering the parameters of the hand motion and at the portion of correcting the law of the hand motion symmetrically with respect to the point of the path of the hand motion, dividing the path into the portion of registering the parameters of the hand motion and the portion of correcting the law of the hand motion.

It can be reasonable in the method of controlling a mechanical resonance hand to select the function relating the additional voltage to the difference between the registered speed at the portion of registering the parameters of the hand motion and the speed measured at the corresponding point of the portion of correcting the law of the hand motion as direct proportionality.

It may be preferable in the method of controlling a mechanical resonance hand to select the function relating the additional voltage to the difference between the registered speed at the portion of registering the parameters of the hand motion and the speed measured at the corresponding point of the portion of correcting the law of the hand motion as a sum of direct proportionality and the integral and derivative of the difference between the speeds at the respective corresponding points of the registering portion and correcting portion, taken with weight coefficients.

The disclosed method of controlling a mechanical resonance hand provides for enhancing the performance reliability of the hand and at the same time for reducing the energy input, ensuring that with a high mean speed of the motion of the hand its approach to the target position would be smooth, yielding high positioning accuracy. The method of controlling a mechanical resonance hand provides for adaptive control, allowing to employ the disclosed method for controlling a mechanical hand of an arbitrary type even in the absence of advance information on the parameters of the manipulated object, the state of the structural components of the mechanical hand and the kind of disturbing influences. The invention provides for on-line control of a mechanical hand even when its required motion from the initial position to the target position is as brief as 0.1 second.

BRIEF DESCRIPTION OF THE DRAWINGS

The invention will be further described in connection with its embodiments, with reference being made to the accompanying drawing showing a block-unit diagram of an apparatus capable of performing a method of controlling a mechanical resonance head according to the invention.

DESCRIPTION OF A PREFERRED EMBODIMENT THE INVENTION

In accordance with the disclosed method of controlling a mechanical resonance head, the hand is released in its initial position and moved towards the required or target position, the supply voltage being fed to the drive motor with the hand moving over at least a part of its path. With the head moving towards its target position, the path of its travel is divided into a portion of registering the parameters of its motion and a portion of correcting the law of its motion. With the hand moving over the portion of registering the parameters of its motion, a reference voltage is supplied to its drive motor, and the speed and running coordinate of the moving hand are measured and registered. With the hand moving over the portion of correcting the law of its motion, the speed of the moving hand is measured at a corresponding point of its path, and then the difference between the speed registered at the portion of registering the parameters of the hand motion and the speed measured at the corresponding point of the portion of correcting the law of the hand motion is computed.

Then an additional voltage is shaped, whose value is a function of the computed difference and whose sign is opposite to the sign of this difference. With the hand moving over at least a part of the portion of correcting the law of its motion, the voltage supplied to the drive motor is made to equal the algebraic sum of the reference voltage and additional voltage. The hand is retained upon reaching the target position. In performing the method according to the present invention, it is possible to measure and register the speed and running coordinate of the moving hand at only one point of the portion of registering the parameters of its motion. However, to step up the accuracy of following up the law of the motion of the mechanical hand, it may be expedient to measure and register the speed and running coordinate of the moving hand at at least two points of the portion of registering the parameters of its motion, which enhances the performance reliability of the mechanical hand. To step up even higher the accuracy of following up the law of the motion of the mechanical hand, it is preferable, however, to measure and register the speed and running coordinate of the mechanical hand continuously at every point of the portion of registering the parameters of its motion, so that the performance reliability of the mechanical hand is enhanced still further. It is possible to divide the path of the travel of the hand into two equal portions. It is expedient to select the respective corresponding points of the path of the moving hand over the portion of registering the parameters of its motion and of the portion of correcting the law of its motion symmetrically with respect to the point dividing the path of the moving hand into the said portions. The function relating the additional voltage to the difference between the speeds of the hand at the respective corresponding points of the portion of registering the parameters of its motion and of the portion of correcting the law of its motion may be selected as direct proportionality. It is more expedient, however, that the function relating the additional voltage to the difference between the speeds of the hand at the respective corresponding points of the portion of registering the parameters of its motion and of the portion of correcting the law of its motion be selected as the sum of direct proportionality and the integral and derivative of the difference between the speeds at the respective corresponding points of the portion of registering the parameters of the hand motion and of the portion of correcting the law of its motion. This would enhance the accuracy of following up the law of the mechanical hand motion, thus adding to its performance reliability.

The disclosed method of controlling a mechanical resonance hand can be implemented by an apparatus of which the block-unit diagram is illustrated in the appended drawing.

The apparatus for performing the method of controlling a mechanical resonance hand comprises a mobile link 1 of the mechanical resonance hand joined to the support structure 2 of the mechanical hand through resilient members 3. The mobile link 1 of the mechanical hand is equipped with a grip 4 for holding a manipulated object 5, and with the movable parts 6, 7 of the respective retaining devices whose stationary parts 8, 9 are secured to the support structure 2 of the mechanical hand. The apparatus further comprises a drive motor 10, a transmitter 11 of the speed of the mobile link 1 and a transmitter 12 of the position of the mobile link 1, the latter being operatively connected with its drive motor 10 and the respective transmitters 11 and 12 of its speed and position. The transmitter 11 of the speed of the mobile link may be of any suitable known design (S. D. Burdakov et al., "Proyektirovaniye manipulatorov promyshlennykh robotov i robotizirovannykh kompleksov" /Designing Manipulators and Robotized Complexes/, Vysshaya Shkola /Moscow/, 1986, pp. 146–147). The transmitter 12 of the position of the mobile link 1 can be likewise of any suitable known design (S. D. Burdakov et al., "Proyektirovaniye manipulatorov promyshlennykh robotov i robotizirovannykh kompleksov", Vysshaya Shkola/Moscow/, 1986, pp. 143–146). The transmitter 11 of the speed of the mobile link 1 and the transmitter 12 of its position are connected to the respective inputs of a master computer 13 having its output connected through an amplifier 14 to the drive motor 10. The apparatus further comprises a generator 15 of reference voltage having its first output connected to the drive motor 10 and its second output connected to the master computer 13. The generator 15 of reference voltage can be of any suitable known design (SU, A, 1346419), or else in can be incorporated in the master computer 13.

OPERATION

The apparatus for performing the disclosed method of controlling a mechanical resonance hand is operated, as follows. The resilient members 3 are adjusted so that the mobile link 1 should be in a state of balance without a manipulated object 5 when the mobile link 1 is at the centre of the distance between its initial position and its target position. In its initial position, the mobile link 1 is held by the engagement of the movable part 7 of the lower retaining device with its stationary part 9, with the resilient members 3 storing potential energy. In this position a manipulated object 5 is introduced into the grip 4 and held thereby. To start the motion of the mechanical resonance hand, the mobile link 1 of the mechanical resonance hand in the initial position is released by energizing an electromagnet (not shown) to disengage the movable part 7 of the lower retaining device from its stationary part 9. With the mobile link 1 released, it moved towards its target position by supplying the reference voltage to the drive motor 1 with the mechanical resonance hand moving over at least a part of its path. While the mechanical hand moves towards its target position, the master computer 13 is operated to divide the path of its travel into a portion of registering the parameters of the hand motion and a portion of correcting the law of the hand motion. In the example being described, the portion of registering the parameters of the hand motion is the portion of its path from the initial position with the coordinate $X_1$ to the point with the coordinate $X_2$, and the portion of correcting the law of the hand motion is the portion from the point with the coordinate $X_2$ to the required position with the coordinate $X_3$, with $X_1=0$, $X_2=0.1$ m and $X_3=0.2$ m.

While the mechanical hand is moving over the portion of registering the parameters of its motion, the reference voltage from the reference voltage generator 15 is fed to the drive motor 10. The reference voltage is selected so that its value may depend either on the speed of the mechanical hand or its coordinate at a given moment. In the example being described, the reference voltage is selected to have a constant value computed so that with the mobile link 1 moving without the manipulated object 5 from its initial position, the voltage of this value supplied over the entire path of the mechanical hand towards its target position should be sufficient to compensate for the energy dissipation in the travel of the mobile link 1 to the target position. With the mobile link 1 moving over this portion of registering the parameters of the hand motion, the transmitter 11 of the speed of the mobile link 1 and the transmitter 12 of the position of the mobile link 1 measure the respective parameters of the hand motion and send the signals corresponding to the thus measured parameters of the hand motion, i.e. of its speed and running coordinate, to the master computer 13 which registers the value of the speed of the mobile link 1 at the moment where the signal coming from the position transmitter 12 equals a value corresponding to the coordinate of the mobile link 1 expressed as $(X_1+l_1)$, where $l_1$ is the distance along the path of the travel of the mobile link 1 from its initial position to the point of this path where the parameters of the mechanical hand motion should be registered. In the example being described, $l_1=0.05$ m.

To move the mobile link 1 of the mechanical resonance hand to the target position, the voltage supplied to the drive motor 10 has to be corrected, and this correction is effected with the hand moving over the portion of correcting the law of its motion. To do this, with the hand moving over the portion of correcting the law of its motion, the master computer 13 determines the point with the coordinate $(X_3-l_2)$ where $X_3$ is the coordinate of the target position of the mechanical resonance hand (i.e. of its mobile link 1), and $l_2$ is the distance along the path of the travel of the mobile link 1 from the target position to the point where the parameters of its motion are registered. In the example being described, $l_2=0.15$ m. It can be seen from the abovesaid that the last-mentioned point where the parameters of the motion of the mechanical hand are registered belongs to the portion of registering the parameters of the hand motion.

As the mobile link 1 is moving over the portion of correcting the law of the hand motion, the transmitter 11 of the speed of the mobile link 1 and the transmiter 12 of its position continue the monitoring of the parameters of the motion of the mechanical hand, sending their signals corresponding to the measured motion parameters to the master computer 13. Until the mobile link 1 of the resonance mechanical hand reaches in its travel the point of its path with the coordinate $(X_3-l_2)$, the drive motor 10 is supplied solely with the reference voltage $U_1$ from the reference voltage generator 15. The value of the reference voltage $U_1$ should not exceed the maximum voltage $U_{max}$ that can be supplied to the drive motor 10. Thus, with $U_{max}=24$ V, $U_1=20$ V. The moment the signal sent by the position transmitter 12 reaches the value corresponding to the coordinate $(X_3-l_2)$, the master computer 13 computes the difference $\Delta V$ between the speed of the mechanical hand registered over the portion of registering the parameters of the hand motion and the speed measured at the last-mentioned corresponding point of the portion of correcting the law of the hand motion, and shapes an additional voltage $U_2$. The value of the additional voltage $U_2$ is computed as a function of the measured difference $\Delta V$, and its sign is opposite to the sign of this difference. In the example being described, the function relating the value of the additional voltage $U_2$ to the difference $\Delta V$ between the speeds at the corresponding points of the portion of registering the parameters of the hand motion and of the portion for correcting the law of the hand motion is selected as direct proportionality. Thus $$U_2 = 100 \frac{Vs}{m} \Delta V,$$

where $\Delta V$ is the speed difference, V—volts, m—meters, s—seconds.

The performance reliability of the mechanical resonance hand controlled according to the disclosed method can be further enhanced if the function relating the additional voltage $U_2$ to the difference $\Delta V$ between the hand speeds at the respective corresponding points of the portion of registering the parameters of the hand motion and of the portion of correcting the law of its motion is selected as a sum of direct proportionality and the integral and derivative of the speed difference $\Delta V$, taken with appropriate weight coefficients (V. A. Besekerski et al., "Teoriya sistem avtomaticheskogo regulirovaniya" /Theory of Automatic Control Systems/, Nauka/Moscow/, 1975, p.112). The master computer 13 receives from the reference voltage generator 15 the information on the value of the reference voltage $U_1$, and following the abovedescribed computations of the speed difference $\Delta V$ and additional voltage $U_2$, sends through the amplifier 14 to the drive motor 14 the voltage of which the value is an algebraic sum of the reference voltage $U_1$ and additional voltage $U_2$. This on-line correction of the voltage supplied to the drive motor 10 ensures the travel of the mechanical hand into the required position with an arbitrary weight (mass) of the manipulated object 5, and also ensures that the mobile link 1 of the mechanical resonance hand in its target position is reliably retained without any excessive impact of the movable part 6 and stationary part 8 of the upper retaining device. Thus, the present invention provides for adaptive control unaffected by the varying parameters of the manipulated object, the design of the mechanical hand and the kinds of the variable parameters, fully suitable for vertical travel. In this way the disclosed method of controlling a mechanical resonance hand provides for enhancing the performance reliability of the mechanical hand.

The return travel of the mobile link 1, either with or without the manipulated object, is effected in a way similar to the abovedescribed procedure.

To ehance still further the performance reliability of the mechanical resonance hand, it can be expedient, as it has been already mentioned, that in the herein disclosed method of controlling the resonance mechanical hand the speed and running coordinate of the hand should be measured and registered at two or more points of the portion of registering the parameters of the hand motion, and the correction of the law of the hand motion should be performed at the corresponding number of points of the portion of correcting the law of the hand motion. For yet further enhancement of the performance reliability of a mechanical resonance hand controlled in accordance with the disclosed method, it can be expedient to measure and register the speed and running coordinate of the hand continuously at every point of the portion of registering the parameters of the hand motion and to correct the law of its motion likewise continuously at every corresponding point of the portion of correcting the law of the hand motion. Thus, it is expedient, when dividing the path of the travel of the mechanical hand into the portion of registering the parameters of its motion and the portion of correcting the law of its motion, to define the portion of registering the parameters of the hand motion from the initial position of the path of its travel to the central point of this travel, and the portion of correcting the law of the hand motion, from the central point of the path of its travel to the required or target position. In other words, it is expedient to divide the path of the intended travel of the hand into two equal portions. It is likewise expedient to select the respective corresponding points of the portions of registering the parameters of the hand motion and correcting the law of its motion symmetrically with respect to the point of the path of the hand travel, dividing it into the said portions.

It can be seen from the abovesaid that the invention provides for maintaining the control of a mechanical resonance hand, unaffected by the variable parameters and the structure of the mechanical resonance hand, thus enhancing its performance reliability.

What is claimed is:

1. A method of controlling a mechanical resonance hand in its travel from an initial position to its target position, including the steps of:

releasing said hand in an initial position;

moving said hand towards said target position, while feeding a first supply voltage with said hand moving over at least part of the path of said travel;

with said hand moving towards said target position, dividing said path of said travel of said hand into a portion of registering the parameters of the motion of said hand and a portion of correcting the law of the motion of said hand;

feeding a second supply voltage of a reference voltage value with said hand moving over said portion of registering the parameters of the motion of said hand;

measuring and registering the speed and running coordinate of said hand in its travel over said portion of registering the parameters of the motion of said hand;

measuring the speed of said hand at a corresponding point of said path of said travel with said hand moving over said portion of correcting the law of the motion of said hand;

computing the difference between the speed registered at said portion of registering the parameters of the motion of said hand and the speed measured at said corresponding point of said portion of correcting the law of the motion of said hand;

shaping a third voltage value which is a function of said computed difference and of a sign opposite to the sign of said difference;

with said hand moving over at least a part of said portion of correcting the law of the motion of said hand, feeding a fourth supply voltage value which is an algebraic sum of said reference voltage value and said third voltage; and retaining said hand at said target position.

2. A method of controlling a mechanical resonance hand, as set forth in claim 1, including:

measuring and registering the speed and running coordinate of said hand at one point of said portion of registering the parameters of the motion of said hand.

3. A method of controlling a mechanical resonance hand, as set forth in claim 1, including:

measuring and registering the speed and running coordinate of said hand at at least two points of said portion of registering the parameters of the motion of said hand.

4. A method of controlling a mechanical resonance hand, as set forth in claim 1, including:
measuring and registering the speed and running coordinate of said hand continuously at every point of said portion of registering the parameters of the motion of said hand.

5. A method of controlling a mechanical resonance hand, as set forth in claim 1, including:
dividing said path of said travel of said hand into said portion of registering the parameters of the motion of said hand and into said portion of correcting the law of the motion of said hand, equal to each other.

6. A method of controlling a mechanical resonance hand, as set forth in claim 1, including:
selecting said function relating said additional voltage to said computed difference between the speed registered at said portion of registering the parameters of the motion of said hand and the speed measured at said corresponding point of said portion of correcting the law of the motion of said hand as direct proportionality.

7. A method of controlling a mechanical resonance hand, as set forth in claim 2, including:
dividing said path of said travel of said hand into said portion of registering the parameters of the motion of said hand and said portion of correcting the law of the motion of said hand, equal to each other.

8. A method of controlling a mechanical resonance hand, as set forth in claim 2, including:
selecting said respective corresponding points of said path over said portion of registering the parameters and said portion of correcting the law of the motion of said hand symmetrically with respect to the point of said path of said travel of said hand, dividing it into said portion of registering the parameters and said portion of correcting the law of the motion of said hand.

9. A method of controlling a mechanical resonance hand, as set forth in claim 2, including:
selecting said function relating said third voltage to said computed difference between the speed registered at said portion of registering the parameters of the motion of said hand and the speed measured at said corresponding point of said portion of correcting the law of the motion of said hand as direct proportionality.

10. A method of controlling a mechanical resonance hand, as set forth in claim 2, including:
selecting said function relating said third voltage to said computed difference between the speeds as a sum of direct proportionality and the integral and derivative of said difference between said speeds at said respective corresponding points, taken with weight coefficients.

11. A method of controlling a resonance mechanical hand, as set forth in claim 3, including:
dividing said path of said travel of said hand into said portion of registering the parameters of the motion of said hand and said portion of correcting the law of the motion of said hand, equal to each other.

12. A method of controlling a resonance mechanical, hand, as set forth in claim 3, including:
selecting said respective corresponding points of said path of said travel over said portion of registering the parameters of the motion of said hand and said portion of correcting the law of the motion of said hand symmetrically with respect to the point of said path of said travel of said hand, dividing it into said portion of registering the parameters of the motion of said hand and said portion of correcting the law of the motion of said hand.

13. A method of controlling a mechanical resonance hand, as set forth in claim 3, including:
selecting said function relating said third voltage to said computed difference between the speeds as a sum of direct proportionality and the integral and derivative of said difference between said speeds at said respective corresponding points, taken with weight coefficients.

14. A method of controlling a mechanical resonance hand, as set forth in claim 4, including:
dividing said path of said travel of said hand into said portion of registering the parameters of the motion of said hand and said portion of correcting the law of the motion of said hand, equal to each other.

15. A method of controlling a mechanical resonance hand, as set forth in claim 4, including:
selecting said respective corresponding points of said path of said travel over said portion of registering the parameters of the motion of said hand and said portion of correcting the law of the motion of said hand symmetrically with respect to the point of said path of said travel of said hand, dividing it into said portion of registering the parameters of the motion of said hand and said portion of correcting the law of the motion of said hand.

16. A method of controlling a mechanical resonance hand, as said forth in claim 4, including:
selecting said function relating said third voltage to said computed difference between the speeds as a sum of direct proportionality and the integral and derivative of said difference between the speeds at said respective corresponding points, taken with weight coefficients.

17. A method of controlling a mechanical resonance hand, as set forth in claim 5, including:
selecting said respective corresponding points of said path of said travel over said portion of registering the parameters of the motion of said hand and said portion of correcting the law of the motion of said hand symmetrically with respect to the point of said path of said travel, dividing it into said portion of registering the parameters of the motion of said hand and said portion of correcting the law of the motion of said hand.

18. A method of controlling a mechanical resonance hand, as set forth in claim 14, including:
selecting said function relating said third voltage to said computed difference between the speeds as a sum of direct proportionality and the integral and derivative of said difference between the speeds at the respective corresponding points, taken with weight coefficients.

19. A method of controlling a mechanical resonance hand, as set forth in claim 15, including:
selecting said function relating said third voltage to said computed difference between the speeds as a sum of direct proportionality and the integral and derivative of said difference between the speeds at said respective corresponding points, taken with weight coefficients.

20. A method of controlling a resonance mechanical hand in its travel from an initial position to its target position, including the steps of:
releasing said hand in its initial position;

moving said hand towards said target position, while feeding a first supply voltage with said hand moving over at least a part of the path of said travel;

with said hand moving towards said target position, dividing said path of said travel of said hand into a portion of registering the parameters of the motion of said hand and a portion of correcting the law of the motion of said hand;

feeding a second supply voltage of a reference voltage value with said hand moving over said portion of registering the parameters of the motion of said hand;

measuring and registering the speed and running coordinate of said hand in its travel over said portion of registering the parameters of the motion of said hand;

measuring the speed of said hand at a corresponding point of said path of said travel, with said hand moving over said portion of correcting the law of the motion of said hand;

computing the difference between the speed registered at said portion of registering the parameters of the motion of said hand and the speed measured at said corresponding point of said portion of correcting the law of the motion of the hand;

shaping a third voltage value which is a function of said computed difference and of a sign opposite to the sign of said difference;

said function being a sum of direct propirtionality and the integral and derivative of said difference between the speeds at said respective corresponding points of said portion of registering the parameters of the motion of said hand and said portion of correcting the law of the motion of said hand;

with said hand moving over at least a part of said portion of correcting the law of the motion of said hand, feeding a fourth supply voltage value which is an algebraic sum of said reference voltage value and said additional voltage, and retaining said hand at said target position.

* * * * *